J. E. FINLEY.
Coffee-Pot.
No. 224,822. Patented Feb. 24, 1880.
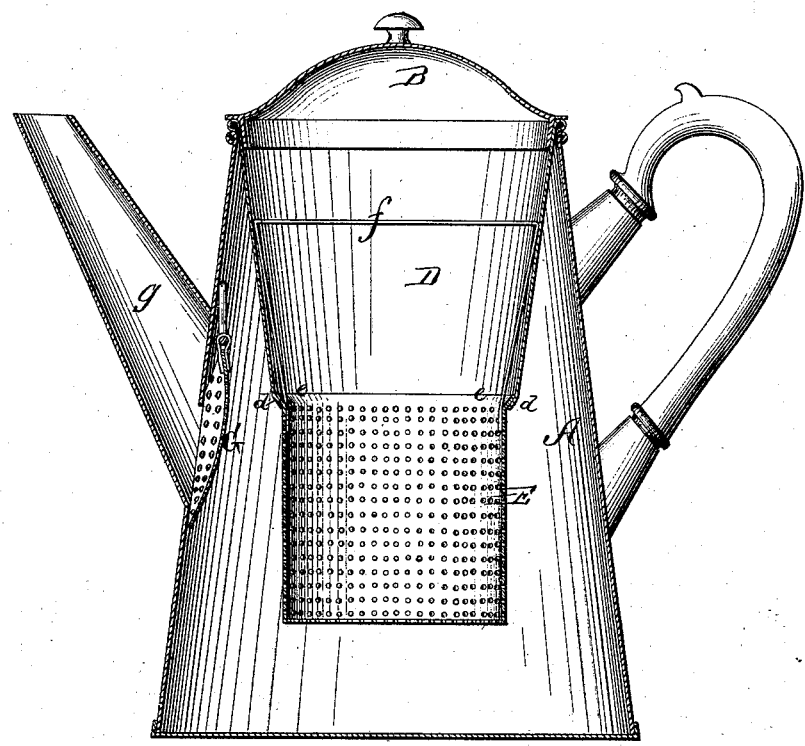
Attest.
J. S. Galloway
J. E. Frost
Inventor.
John E. Finley

UNITED STATES PATENT OFFICE.

JOHN E. FINLEY, OF MEMPHIS, TENNESSEE.

COFFEE-POT.

SPECIFICATION forming part of Letters Patent No. 224,822, dated February 24, 1880.

Application filed July 28, 1879.

*To all whom it may concern:*

Be it known that I, JOHN E. FINLEY, of Memphis, in the State of Tennessee, have invented certain new and useful Improvements in Coffee-Pots; and I do hereby declare that the following is a full, clear, and exact description thereof, reference being had to the accompanying drawing, and to the letters of reference marked thereon, which form a part of this specification, and in which the figure is a central vertical section of a coffee-pot having my improvement attached.

The nature of my improvement consists in the peculiar construction and arrangement of the parts hereinafter mentioned, and which will be more specifically set forth in the claim.

To enable others skilled in the art to which my invention appertains to make and use the same, I will now proceed to describe its construction.

A represents the coffee-pot, made in the usual manner and provided with top B. D is the holder, which is simply an open-ended cylinder flaring outwardly toward the top, and provided with a rim which rests upon the mouth of the coffee-pot and prevents the holder from slipping too far down. The lower end of this holder is provided with an inwardly-projecting flange, $d$.

E is the coffee-receptacle, and is a cylindrical box, open at the top, which is formed with an outward flange, $e$, resting upon the flange $d$ and holding the box or receptacle off the bottom. This coffee-holder is perforated upon the bottom and sides, to allow the steam and water to filter through and act upon the coffee contained therein. It is also provided with a wire bail, $f$, by which it may be lifted out.

G is a perforated metal shield or strainer, hinged at its upper edge, as seen in the drawing, so that by its own gravity it will cover the inner end of the spout $g$, and may be readily raised when cleaning the coffee-pot, in order to wash both sides of the strainer.

All the parts of my invention may readily be detached for cleaning.

I am fully aware that it is not new to suspend a perforated coffee-receptacle within a coffee-pot, and hence do not claim such, broadly, as my invention; but What I do claim as new, and desire to secure by Letters Patent, is—

The combination, with a coffee-pot, of the holder D, formed with an external flange at its top and internal flange, $d$, at its bottom, the detachable perforated cup E, having flange $e$, and bail $f$, all constructed and arranged as herein described.

JOHN E. FINLEY.

Attest:
  J. S. GALLOWAY,
  J. E. FROST.